US006823650B2

(12) United States Patent
Recchia, Jr.

(10) Patent No.: US 6,823,650 B2
(45) Date of Patent: Nov. 30, 2004

(54) METHOD FOR FORMING A BAG WITH MESH WALL

(76) Inventor: Michael J. Recchia, Jr., 32 W. Schreiber, Roselle, IL (US) 60172

( * ) Notice: Subject to any disclaimer, the term of this patent is extended or adjusted under 35 U.S.C. 154(b) by 507 days.

(21) Appl. No.: 09/895,477

(22) Filed: Jun. 28, 2001

(65) Prior Publication Data

US 2001/0036496 A1 Nov. 1, 2001

Related U.S. Application Data

(62) Division of application No. 09/481,211, filed on Jan. 11, 2000, now Pat. No. 6,506,429.

(51) Int. Cl.[7] .......................... B65B 61/20; B65B 43/04
(52) U.S. Cl. .............................. 53/415; 53/455; 53/459
(58) Field of Search .......................... 53/415, 459, 469, 53/455, 479, 562

(56) References Cited

U.S. PATENT DOCUMENTS

| | | | |
|---|---|---|---|
| 1,858,159 A | | 5/1932 | Laymon |
| 2,085,365 A | | 6/1937 | Israel |
| 2,347,439 A | * | 4/1944 | Shea et al. ..................... 53/455 |
| 2,349,672 A | | 5/1944 | Nielsen |
| 2,877,609 A | * | 3/1959 | Bodolay et al. ............... 53/455 |
| 3,123,279 A | * | 3/1964 | Day .......................... 383/102 |
| 3,257,915 A | * | 6/1966 | Cartier et al. ................ 493/196 |
| 3,319,538 A | * | 5/1967 | Bodolay et al. ............... 53/562 |
| 3,498,023 A | * | 3/1970 | Reid et al. ..................... 53/562 |
| 3,552,637 A | | 1/1971 | Swinford |
| 3,554,368 A | | 1/1971 | Nagel |
| 3,817,017 A | | 6/1974 | Titchenal |
| 4,756,144 A | * | 7/1988 | Jostler .......................... 53/568 |
| 4,769,966 A | | 9/1988 | Petri |
| 4,774,797 A | * | 10/1988 | Colamussi et al. ............ 53/459 |
| 4,804,971 A | | 2/1989 | Bruns et al. |
| 4,945,714 A | * | 8/1990 | Bodolay et al. ............... 53/562 |
| 4,994,137 A | | 2/1991 | Yanai |
| 5,358,592 A | | 10/1994 | Fukuyama |
| 5,687,549 A | * | 11/1997 | Jostler et al. .................. 53/450 |
| 5,771,664 A | | 6/1998 | Recchia |
| 5,919,504 A | | 7/1999 | Muise et al. |
| 6,015,373 A | | 1/2000 | Henderson et al. .......... 493/196 |
| 6,024,489 A | | 2/2000 | Fox et al. ........................ 383/9 |
| 6,030,120 A | * | 2/2000 | Fox et al. ........................ 383/9 |
| 6,058,681 A | * | 5/2000 | Recchia, Jr. .................. 53/455 |
| 6,068,898 A | | 5/2000 | Oyama |
| 6,080,093 A | | 6/2000 | Henderson et al. .......... 493/187 |
| 6,190,044 B1 | * | 2/2001 | Fox et al. ........................ 383/9 |
| 6,245,456 B1 | | 6/2001 | Fukuda |
| 2001/0036496 A1 | | 11/2001 | Recchia, Jr. |

FOREIGN PATENT DOCUMENTS

| | | | |
|---|---|---|---|
| EP | 0677450 | * | 4/1994 |
| JP | 402045359 A | | 2/1990 |
| JP | 5-65146 | * | 3/1991 |
| JP | 07101720 | | 12/1995 |
| JP | 11-130089 | | 5/1999 |

* cited by examiner

*Primary Examiner*—John Sipos
(74) *Attorney, Agent, or Firm*—Garrettson Ellis; Seyfarth Shaw LLP

(57) ABSTRACT

Bags for produce or the like are prepared by advancing a thermoplastic sheet and a mesh sheet, each having an upper edge, along a process line. The plastic sheet has a bottom portion which is folded to define a lower edge of the thermoplastic sheet at a fold line. One seals the folded portion of the solid-wall thermoplastic sheet to a lower edge of the mesh sheet. Transverse slits are then formed in the sheets, and the sheets are heat sealed together near edges of the slits to form separate bags between the slits. The slits extend across both lower edges of the bags, but are preferably spaced from the upper edges. One drops produce between the sheet upper edges into the bags, and the bags are then heat sealed adjacent to the upper edges thereof, and subsequently separated by cutting. A novel heat seal die is also shown.

18 Claims, 2 Drawing Sheets

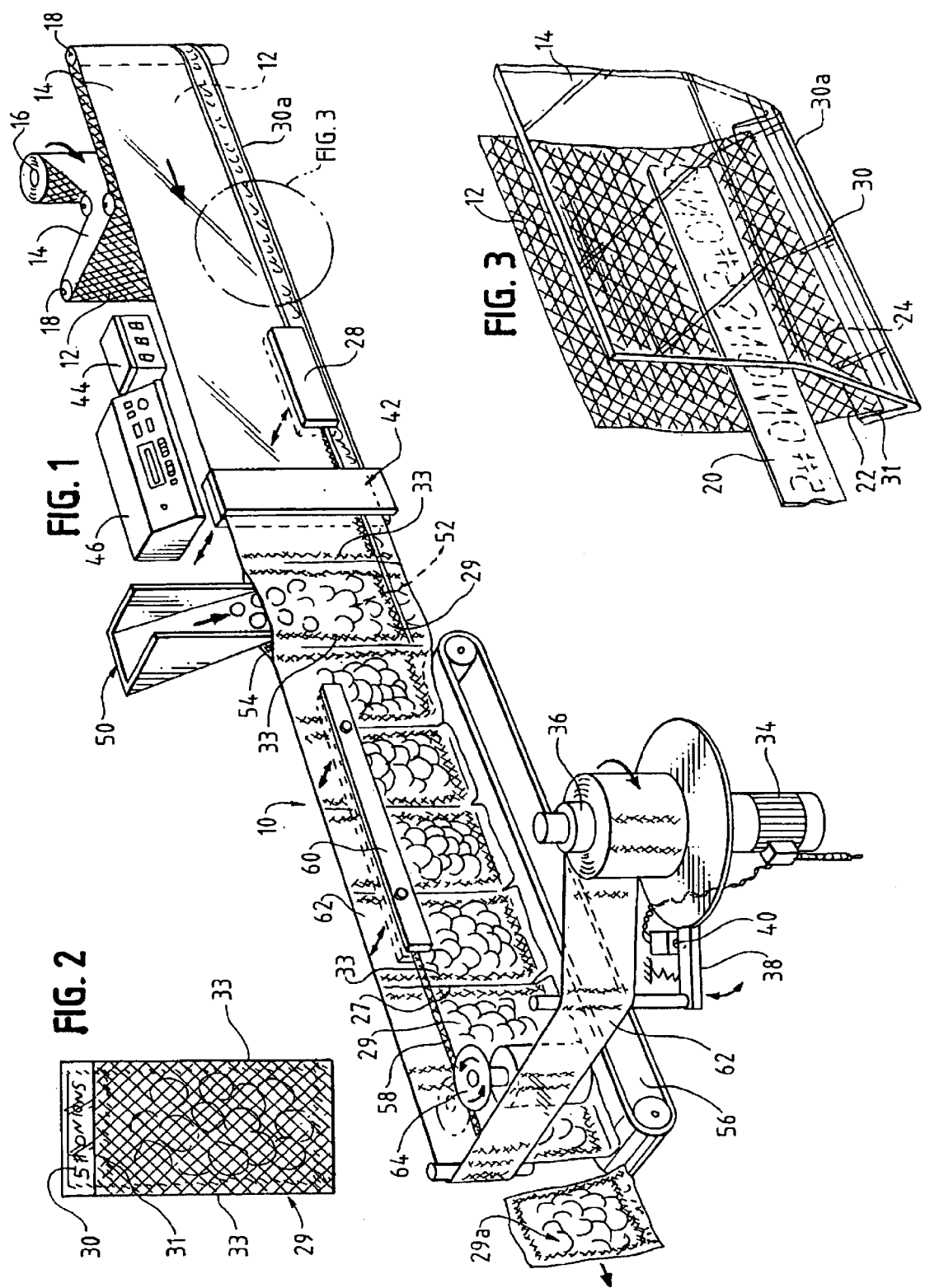

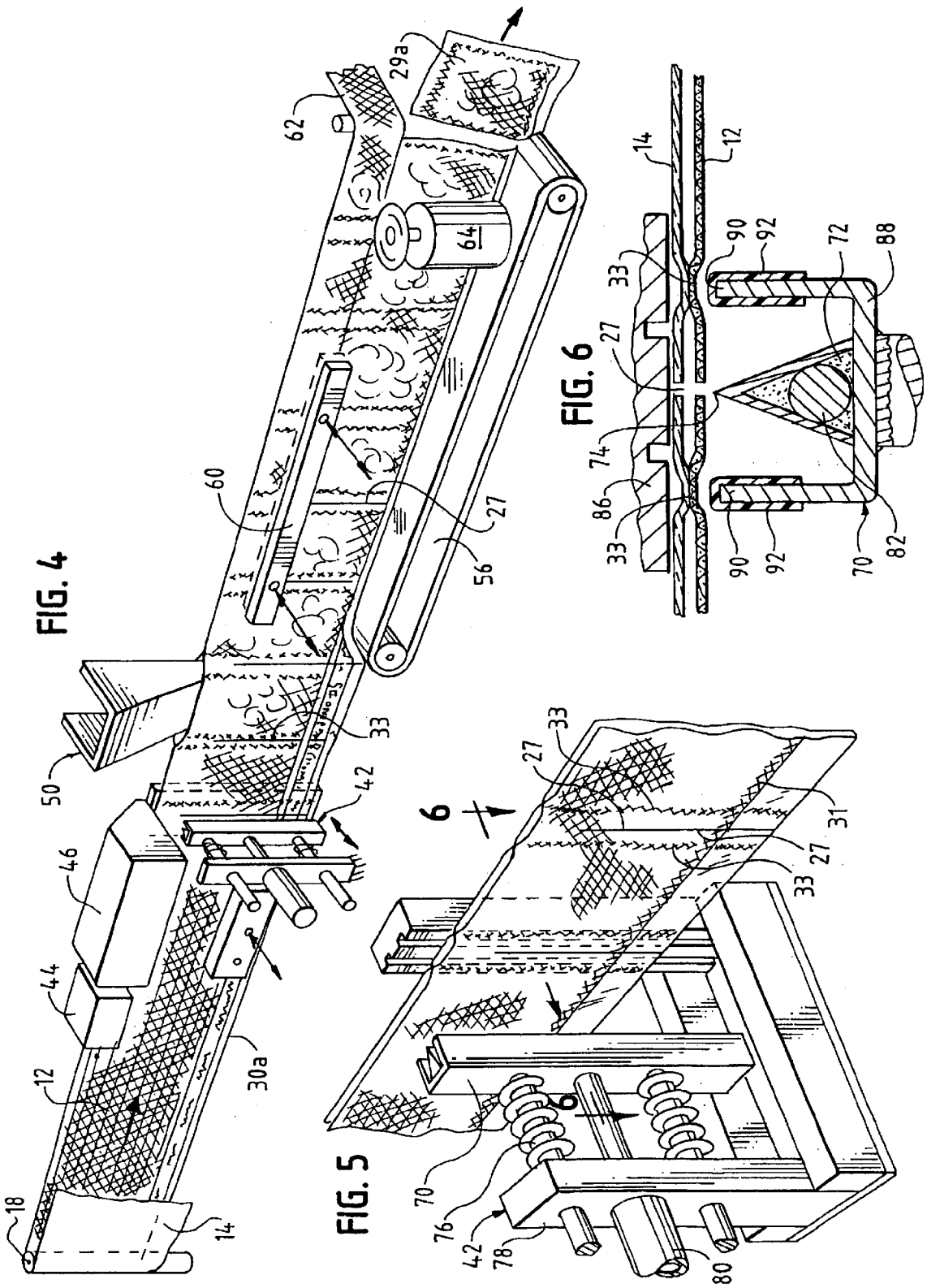

METHOD FOR FORMING A BAG WITH MESH WALL

This is a divisional application of U.S. application Ser. No. 09/481,211, now U.S. Pat. No. 6,506,429 filed on Jan. 11, 2000

BACKGROUND OF THE INVENTION

Bodolay et al. U.S. Pat. No. 3,319,538 shows a bag making machine comprising a continuous process line for making bags of plastic sheeting by heat sealing and cutting of a continuous length of plastic sheeting. The sheeting is folded longitudinally to define an intact, folded bottom edge. The bags may be filled with produce or the like as they are formed on the process line.

As a later step, the sides of the partially formed bag are simultaneously sealed and cut away, leaving a connected top strip of the plastic, to permit completion of the bag-forming process with a filling and a top-sealing step.

However, technical problems arise as the cutting takes place at or next to the hot, immediately-formed vertical seals. The seals can be damaged by the cutting blade since they are still fresh, hot, and soft, and plastic material can adhere to the blade since it is in viscous, liquid form. The plastic can adhere there, to interfere with the subsequent cutting process of the Bodolay et al. process line.

Furthermore, some bag containers are not suitable for the storage of onions, for example, which require a large degree of air ventilation in order to avoid premature spoiling, so that a bag made out of plastic sheeting on both sides is not suitable for use.

By this invention, a bag is provided which is suitable for the storage of onions and other products where a high degree of open ventilation is necessary or desired, while such a bag may be made on an automated process line from rolls of plastic material. Furthermore, a novel heat seal and cutting die is provided in which the cutting and the heat sealing may be simultaneous, but without the technical difficulties that arise in Bodolay et al. when heat seal lines are formed with a simultaneous cutting step.

DESCRIPTION OF THE INVENTION

By this invention, a process for the manufacture of bags made from plastic sheets is disclosed where, preferably, one side of the bag comprises a mesh sheet, which is typically made out of plastic, and which is heat sealed at its periphery to a solid-wall, thermoplastic sheet to form the complete bag. By the method of this invention, one advances a pair of sheets, one of which is a solid thermoplastic sheet and the other of which comprises a mesh, along a process line. One side of the thermoplastic, solid-wall sheet is folded over on a fold line to engage a corresponding side of the narrower mesh sheet. A longitudinal seal line is formed between them, which seal line is spaced from the fold line. One forms transverse slits in both of the sheets together, and one heat seals the sheets together at edges of the slits to form separate, sealed bag edges. The slits extend across edges of the combined sheets, but are spaced from the opposed, typically upper, edges.

One then drops produce or other desired materials between the open, upper edges of the two sheets. Thereafter, the bags may be heat sealed along the upper sheet edges thereof, preferably by sealing at a point spaced from the upper edges of the sheets of the process line, while cutting a line spaced from the upper edge seal, so that a waste strip of plastic sheeting is retained on the process line, and the bag, comprising a joined mesh sheet wall and solid plastic sheet wall, and sealed at all four sides, drops away.

Preferably, the sealing of the side edges and other edges of the bag may be accomplished by a heat seal die, which comprises first and second heat seal bars for joining the sheets with heat seal lines (both mesh and solid sheets). The bars are spaced from each other in parallel relation, but no more than about two inches apart and preferably less than one inch. A heated cutter edge for cutting aligned, linear cuts in the sheets (mesh and solid) is provided, with the cutter edge being positioned between the heat seal bars. A system is provided for heating the heat seal bars and the cutter edge, each above the softening temperature of at least one of the sheets and preferably both. An anvil is positioned to back the sheets, against which the heat sealing and cutting takes place.

The heat seal bars preferably carry a high-temperature stable anti-adhesive, such as one or more layers of polytetrafluoroethylene, to prevent sticking of the plastic sheets to seal bars. Such sheeting may be made of material sold under the trademark Teflon.

Preferably a heater rod extends through a cutter body that defines a cutter edge. A major portion of the heater rod is in contact with the cutter body, while a minor portion (typically on the order of about 10% or 20%) of said heater rod is in heat-flow contact with the heat seal bars. Accordingly, a greater heat flow passes to the cutter edge than passes to the seal bars, so that the temperature of the cutter edge is automatically greater than the temperature of the seal bars where they engage the plastic sheets for heat sealing. Thus, the cutter edge is highly effective to make a smooth cut through both sheets, as the seal bars form parallel heat seal lines spaced from the cutter edge.

Preferably, the heat seal bars comprise arms of an integral, U-shaped structure, so that they both may be heated from a single area of contact with the heater rod.

Preferably, the mesh sheeting is positioned so that one set of parallel strands of the mesh extends in the direction of motion of the sheeting along the process line, so that the mesh sheeting is longitudinally stretch-resistant.

The heat sealing and cutting die of this invention simultaneously provides a pair of spaced heat seals to form edges of separate bags, and a cut between the heat seals in the integral sheeting that forms the bag, with the cut being spaced from the respective seal lines so that the hot plastic of the seal lines is not disturbed by the cutting process. Thus, strong, peripheral seals are provided to a continuing series of bags as the manufacture thereof takes place.

DESCRIPTION OF THE DRAWINGS

FIG. 1 is perspective view of a process line incorporating the invention of this application;

FIG. 2 shows an individual bag made by the process of FIG. 1 in an inverted form so that the header is on top;

FIG. 3 is a fragmentary, perspective view showing how a label strip or the like can fit within the header as it is being formed;

FIG. 4 is a perspective view of the process line of FIG. 1, seen from the other side;

FIG. 5 is a fragmentary, perspective view of the station in the process line of FIG. 4 where vertical bag side seals are formed, and the strip is simultaneously cut, to partially separate the bags from the overall strip, with the portion of the upper lateral portion of the sheeting being broken away; and FIG. 6 is an enlarged, transverse sectional view of the sealer/cutter die used at the sealing station of FIG. 5.

DESCRIPTION OF SPECIFIC EMBODIMENTS

Referring to the drawings, process line 10 comprises a pair of plastic sheets. One of the plastic sheets is a mesh sheet 12 and the other a solid, aperture-free plastic sheet 14, shown to be wound together on a spool 16. If desired of course, the sheets in strip form may be drawn off of a pair of separate plastic spools and brought together. The sheets pass along rollers 18, and a strip of paper 20 (FIG. 3) may be placed between them or may be advanced between them, with the paper strip carrying label indicia. Initially, a bottom edge 22 of solid-wall plastic sheet 14 may be pre-folded as wound on spool 16 and pre-sealed to the lower edge 24 of mesh sheet 12. Alternatively, the bottom edge 22 of plastic sheet 14 may be folded upwardly within a folder unit on the process line. The joined sheet or web edges are sealed with a strong heat seal 31 at station 28, as shown particularly in FIG. 5. The location of seal line 31 is also shown in FIG. 3, though at the moment shown the seal 31 has not yet been formed.

The seal 31 is between folded up edge 22 of solid-wall sheeting 14 and the lower edge 24 of mesh sheeting 12, so that a header section 30 is provided where both of the sides of the bag are made of the solid-wall sheeting. Paper indicia strip 20 may fit in there as wound on spool 16 and be sealed, being retained by the fold line 30a on one side and the heat seal 31 on the other.

The two sheets 12, 14 on process line 10 are advanced by motor 34, which rotates spool 36. A spring tension arm 38, rotatable and spring-biased at a desired tension, advances the respective strips 12, 14 on the process line as the spool rotates, with tension arm 38 providing a relatively constant tension to the process line to cause advancement. As tension arm swings to its limit of rotation, being driven there by the rotation of spool 36, limit switch 40 senses such motion and shuts off motor 34. Then, the line advances by spring tension, with rotation of arm 38 until it is back to its other limit position rotationally spaced from the limit switch position, and motor 34 is once again turned on to rotationally advance arm 38 again. Thus, continuous operation at relatively constant tension of advancement is provided to the process line.

After the formation of the horizontal header seal 31 and the header 30, the two strips or webs of sheeting 12, 14 are advanced to bag side seal station 42. At this station, the sides of the respective bags are defined by vertical seals 33, and the bags are partially separated by cutting of vertical slits 27 (FIG. 6). Controls for the heat sealer station 28 and the sealers and cutter of station 42 may be found in control panels 44, 46, which provide power and operating control to stations 28, 42. Slits and seals 27, 33 are spaced from the upper edges 54 of strips or webs 12, 14.

As the sealed plastic strips or webs 12, 14 move along the process line, they encounter a product chute 50, which connects to a source of the product such as onions. A metered amount of the onions 52 are placed into the newly formed bag 29 between respective vertical seals 33 through the open top of the bag provided by the yet-unsealed upper edges 54 of the respective webs 12, 14.

Then, as the respective webs 12, 14 move farther down the process line, the filled bags 29 are supported by a bottom conveyor belt 56, which moves with the newly formed and filled connected bags 29.

A top horizontal seal 58 is then provided on the process line by horizontal sealer 60. Top seal 58 is spaced from the top edge 54 of the respective webs 12, 14 to preserve a continuous strip 62 above the horizontal top seal 58. This strip 62 is shown in generally enlarged width for clarity of illustration. Practically speaking, it will be narrower than shown for purposes of efficient usage of the plastic strip material. Then, the sealed bags 29 are advanced to a horizontal cutter 64, which forms a cut just above horizontal seals 58, being spaced from sealer 60 so that the seal 58 has a chance to cool and harden before encountering cutter 64. Cutter 64 is positioned to intersect each vertical slit 27, thus separating each filled bag 29a from the top web portion 62. Each filled bag 29a then falls off the end of bottom support conveyor belt 56 as a finished product.

The top web portion 62 that remains is then wound on spool 36, and provides a recyclable material.

Turning to FIGS. 5 and 6, vertical sealer and cutter member 42 is shown to comprise a heat seal die 70 having an integral heated cutter 72 with a cutter edge 74, mounted on an adjustable shaft arrangement comprising a pair of spring mounted shafts 76 carried in block 78, and operated by conventional, adjustably positionable apparatus permitting the opening and closing of heat seal die 70 for operation. Central tube 80 provides electric cable to heat a heater rod 82, which extends longitudinally within cutter body 72 to provide desired heating to cutter edge 74, so that the vertical cut that is provided to webs 12, 14 is a clean cut as cutter edge 74 cuts the webs and presses against anvil block 86. The respective pairs of heat seal lines 33 that bracket cutter body 72 are formed by a U-shaped heater die 88, having a pair of arms defining outer heat sealing tips 90 for providing heat to the vertical heat seals. The outer ends of arms 90 are encased with typically one or two layers of polytetrafluoroethylene (PTFE) sheeting 92 to serve as a high-temperature-stable, anti-adhesive layer to prevent sticking of plastic sheets 12, 14 to seal bars 90.

Also, it can be seen that a major portion of the circumference of heater bar 82 is in contact with cutter body 72, while only a minor portion 94 of the periphery of heater rod 82, on the order of ten to thirty percent, is in contact with the U-shaped structure 88 comprising the pair of spaced heat sealed bars 90. Thus, a greater portion of the heat flowing from heater rod 82 flows into cutter body 72, when compared with the amount of heat that flows into U-shaped body 88 comprising the heat seal dies 90. Accordingly, cutter edge 74 can be of a higher temperature than the corresponding edges of heater die arms 90, so that cutter edge 74 penetrates webs 12, 14 more easily than heat sealed die arms 90. Furthermore, the presence of PTFE layers 92 can serve to increase the temperature differential between cutter edge 74 and the temperature encountered at heat seals 33. Then, heater rod 82 can be adjusted to emit heat at such a degree that the desired temperature is provided at heat seals 33, and cutter edge 74 then operates at a significantly higher temperature for better cutting action, while the three members 90, 74 that act upon the plastic sheeting are all heated from a single heater rod 82.

Heat seal die arms 90 may be spaced from each other by about three quarters of an inch, which provides sufficient spacing so that the cutter edge 74 does not interfere with the simultaneous formation of good uniform heat seals 33.

Thus, a process is provided in which bags having substantially a mesh material on one side and solid-wall sheet on the other are manufactured from a web of each material, being filled on the process line and emerging from the process line in a complete filled form, ready for sale. Such bags provide a high level of ventilation for product such as onions, while enjoying a highly automated packaging process.

The above has been offered for illustrative purposes only, and is not intended to limit the scope of the invention of this application, which is as defined in the claims below.

That which is claimed:

1. The method of preparing bags for produce or the like, which comprises:

advancing a solid-wall thermoplastic sheet and a mesh sheet, each having an upper edge, along a process line;

folding a bottom portion of said plastic sheet upwardly to define a lower edge of said thermoplastic sheet at a fold line;

sealing an upper end of the upwardly folded portion of said solid-wall thermoplastic sheet to a lower end of said mesh sheet while leaving the unfolded solid-wall sheet portion unsealed to form a solid wall header section extending away from said lower end of said mesh sheet; forming transverse slits in said sheets, and heat sealing the sheets together at edges of said slits to form separate bags between said slits, said slits extending across both sheet lower edges of the bag but being spaced from said upper edges;

dropping produce between said sheet upper edges into said bags; and heat sealing said bags adjacent to the upper edges thereof.

2. The method of claim 1 in which, by said heat sealing, heat seals are formed by a heat seal die which comprises first and second heat seal bars for forming heat seal lines between said plastic sheet and said mesh sheet, said heat seal bars being spaced in parallel relation from each other no more than about two inches apart, said heat seal die further comprising a heated cutter edge for cutting linear cuts in said plastic sheet and mesh sheet, said cutter edge being positioned between said heat seal bars; and further including the step of heating said heat seal bars and the cutter edge above the softening temperature of the plastic sheet.

3. The method of claim 2 in which said heat seal bars carry a high-temperature-stable, anti-adhesive layer to prevent sticking of said plastic sheets to said seal bars.

4. The method of claim 2 including the step of heating a heater rod in which said heater rod extends through a cutter body that defines said cutter edge, a major portion of said heater rod being in contact with said cutter body and a minor portion of said heater rod being in contact with said heat seal bars, and the heater rod is heated to raise the temperature of said cutter edge greater than the temperature of said seal bars where they engage the plastic sheet and the mesh sheet.

5. The method of claim 4 in which said heat seal bars comprise arms of an integral, U-shaped structure.

6. The method of claim 2 in which said mesh sheet comprises at least two sets of parallel strands in crossing relation to each other, one of said sets of strands being substantially parallel to the direction of advancement of said thermoplastic sheet and said mesh sheet along said process line.

7. The method of claim 1 which further includes the steps of:

dropping produce between said sheet upper edges into said bag prior to heat sealing said bags adjacent to the upper edges thereof to seal the bag interiors; and separating the joined bags.

8. The method of claim 1 in which said mesh sheet comprises at least two sets of parallel strands in crossing relation to each other, and including the step of advancing said laterally joined bags along a process line, one of said sets of strands being substantially parallel to the direction of advancement of said thermoplastic sheet and said mesh sheet along said process line.

9. The method of claim 1 including the step of inserting an indicia strip into the header section, said strip being enclosed by thermoplastic sheet portions of said header section.

10. The method of claim 1 in which an indicia strip is inserted into the header section to be enclosed by a pair of thermoplastic sheet portions, and sealing said indicia strip within said header section.

11. The method of preparing bags for produce or the like, which comprises:

advancing a solid-wall thermoplastic sheet and a mesh sheet, each having an upper edge, along a process line;

folding a bottom portion of said plastic sheet upwardly to define a lower edge of said thermoplastic sheet at a fold line; and sealing an upper end of the upwardly folded portion of said solid-wall thermoplastic sheet to a lower end of said mesh sheet while leaving the unfolded solid-wall sheet portion unsealed to form a solid wall header section extending away from said lower end of said mesh sheet; and transversely heat sealing the sheets together to form separate bags which are laterally connected together to form a strip of said connected bags.

12. The method of claim 11 in which the transverse heat sealing includes the step of forming transverse slits in said sheets, and heat sealing the sheets together at edges of said slits to form separate bags between said slits, said slits extending across the lower edge of the bags, but being spaced from said upper edge, whereby said bags remain as a laterally connected, integral web of a plurality of bags.

13. The method of claim 12 in which an indicia strip is inserted into the sealed, upwardly folded portion of said solid-wall thermoplastic sheet, said strip being enclosed by a pair of thermoplastic sheet portions.

14. The method of claim 11 in which an indicia strip is inserted into the sealed, upwardly folded portion of said solid-wall thermoplastic sheet to be enclosed by a pair of thermoplastic sheet portions.

15. The method of claim 11 in which said transverse heat sealing is done by a heat seal die which comprises first and second heat seal bars for forming heat seal lines between said plastic sheet and said mesh sheet, said heat seal bars being spaced in parallel relation from each other no more than about two inches apart, said heat seal die further comprising a heated cutter edge for cutting linear cuts in said plastic sheet and mesh sheet, said cutter edge being positioned between said heat seal bars, and including the step of providing a system for heating said heat seal bars and the cutter edge to above the softening temperature of the plastic sheets.

16. The method of claim 15 including the step of heating a heater rod which extends through a cutter body that defines said cutter edge, a major portion of said heater rod being in contact with said cutter body and a minor portion of said heater rod being in contact with said heat seal bars, whereby the temperature of said cutter edge is greater than the temperature of said heat seal bars where they engage the plastic sheet and the mesh sheet.

17. The method for preparing bags for produce of the like, which comprises:

advancing a solid-wall thermoplastic sheet and a mesh sheet, each having an upper edge, along a process line;

and folding a bottom portion of said solid-wall thermoplastic sheet upwardly to define a lower edge of said thermoplastic sheet at a fold line; and sealing an upper end of the upwardly folded portion of said solid-wall thermoplastic sheet to a lower end of said mesh sheet while leaving the unfolded solid-wall sheet portion unsealed to form a solid wall header section extending away from said lower end of said mesh sheet, both sides of said header section being made of said solid-wall thermoplastic sheeting; inserting an indicia strip into the sealed, upwardly folded portion of said solid-wall thermoplastic sheet that comprises said header section; transversely heat sealing the sheets together to form separate bags which are laterally connected together to form a strip of said connected bags, said transverse heat sealing including the step of forming transverse slits in said sheets which cuts said indicia strip into separate sections, and heat sealing the sheets together at edges of said slits to form separate bags between the slits, said slits extending across the lower edge of said bags, but being spaced from said upper edge, whereby said bags remain as a laterally connected, integral web of a plurality of bags; and thereafter separating at least one bag from said strip.

18. The method of claim 17 in which, prior to separating bags from said laterally connected, integral web, dropping produce between said sheet upper edges into said bag, and then heat sealing said bags adjacent to the upper edges thereof to seal the bag interiors.

* * * * *